United States Patent [19]
Yamada et al.

[11] Patent Number: 4,915,229
[45] Date of Patent: Apr. 10, 1990

[54] SHEET FILM PACKAGE AND BUFFER SHEET MEMBER

[75] Inventors: Sadami Yamada, Kanagawa; Mutsuo Akao, Minamiashigara, both of Japan

[73] Assignee: Fuji Photo Film Co., Ltd., Kanagawa, Japan

[21] Appl. No.: 149,246

[22] Filed: Jan. 27, 1988

[30] Foreign Application Priority Data

Jan. 28, 1977 [JP] Japan ................... 62-15984
Jan. 29, 1987 [JP] Japan ................... 62-18921
May 7, 1987 [JP] Japan ................... 62-109700
Aug. 7, 1987 [JP] Japan ................... 62-198794

[51] Int. Cl.⁴ ........................................... B65D 81/30
[52] U.S. Cl. ................................. 206/455; 378/182; 378/188
[58] Field of Search .................. 206/449, 454–456; 354/275; 355/72; 378/182, 188

[56] References Cited

U.S. PATENT DOCUMENTS 2,002,035  5/1935  Liebeskind ................. 206/455
3,246,741  4/1966  Doyle ......................... 206/454
3,458,033  7/1969  Ariyasu et al. ............ 206/455
3,651,933  3/1972  Bell ............................ 206/449
4,537,307  8/1985  Tamura ...................... 206/454
4,565,733  1/1986  Akao .......................... 428/215

FOREIGN PATENT DOCUMENTS 0115802  8/1984  European Pat. Off. .
0231834  8/1987  European Pat. Off. .
0876403  8/1942  France ....................... 206/454
61-20591  6/1986  Japan .
0575104  2/1946  United Kingdom ....... 206/455

Primary Examiner—Jimmy G. Foster
Attorney, Agent, or Firm—Sughrue, Mion, Zinn, Macpeak & Seas

[57] ABSTRACT

A sheet film package comprises a casing, a stack of sheet films stored in said casing, and a protective board disposed in said for protecting said sheet films. The protective board has a holder portion integrally joined to one side edge of an upper panel and/or a lower panel thereof for preventing the sheet films from being displaced in a direction transverse to the direction in which the sheet films wil be fed out. The sheet film package also includes a buffer sheet member disposed on the lower panel of the protective board for placing the sheet films on the buffer sheet member. The buffer sheet member has at least one opening such as a hole or a slit for leaking suction air in each of two symmetrical areas of the buffer sheet member, one of which will be contacted by a suction cup of a film delivery mechanism disposed in a device in which the sheet film package can be loaded. The buffer sheet member has a foamed sheet layer made of thermoplastic resin.

10 Claims, 16 Drawing Sheets

SHEET FILM PACKAGE AND BUFFER SHEET MEMBER

BACKGROUND OF THE INVENTION

The present invention relates to a sheet film package and a buffer sheet member, and more particularly to a sheet film package for loading a plurality of sheet films sealed in a flexible bag-shaped light-shielding member into an image recorder or the like and for allowing the sheet films to be smoothly delivered or fed in a prescribed direction, and also to a buffer sheet member for preventing the sheet films in the sheet film package from having pressure marks.

Radiation image films are generally used in the medical field for recording radiation images of objects such as human bodies with an X ray for medical diagnosis. For photographing an object on such a radiation image film, it has been customary to load the film into a radiation image photographing device under a light-shielded environment and expose the emulsion layer of the film directly to an X ray having passed through the object for recording the image of the object thereon.

There has recently been developed and widely used, particularly in the medical field, a radiation image recording and reproducing system for producing the radiation-transmitted image of an object using a stimulable phosphor material capable of emitting light upon exposure to stimulating rays. When a certain phosphor is exposed to a radiation such as X-rays, $\alpha21$-rays, $\beta$-rays, $\gamma$-rays, cathode rays, or ultraviolet rays, the phosphor stores a part of the energy of the radiation. When the phosphor exposed to the radiation is subsequently exposed to stimulating rays such as visible light, the phosphor emits light in proportion to the stored energy of the radiation. The phosphor exhibiting such a property is referred to as a "stimulable phosphor".

In the radiation image recording and reproducing system employing such a stimulable phosphor, the radiation image information of an object such as a human body is stored in a sheet having a layer of stimulable phosphor, and then the stimulable phosphor sheet is scanned with stimulating rays such as a laser beam to cause the stimulable phosphor sheet to emit light representative of the radiation image. The emitted light is then photoelectrically detected to produce an image information signal that is electrically processed for generating image information which is recorded as a visible image on a recording medium such as a photosensitive material or displayed as a visible image on a CRT or the like.

The visible image thus produced may be recorded on a recording medium by an image recorder such as an image output laser printer, for example. In the image output laser printer, photographic films stored as a recording material in a magazine are loaded, and taken out one by one by a sheet delivery device such as a suction disk or cup. Thereafter, the film is exposed to a laser beam modulated by an electric signal produced from the stimulable phosphor sheet, for thereby recording an image on the film. The exposed film is then transferred into an automatic developing device and processed thereby to develop the image. The film is thereafter stored in a prescribed place or used for medical diagnosis when required.

When loading the films into the image output laser printer, they must not be exposed to extraneous light as is the case with the conventional radiation image photographing device. Therefore, it is general practice to load the films into the image output laser printer in a dark room, but the efficiency of such a loading process is low.

There is a strong demand for the loading of films under bright conditions such as in an ordinary bright room, and various arrangements have been proposed for loading films in bright environments One such proposal is disclosed in Japanese Laid-Open Utility Model Publication No. 61(1986)-20591, for example.

The disclosed scheme will briefly be described below with reference to FIG. 1 of the accompanying drawings. FIG. 1 shows in cross section a package 2 which can be loaded into a radiation image photographing device through a magazine (not shown). The package 2 comprises a bag 4 and a protective board 6 of paper for protecting films F stored in the bag 4. The bag 4, with the films F and the protective board 6 contained therein, has its opposite ends 4a, 4b closed off.

The protective board 6 has a substantially J-shaped cross-section including a lower panel 6a, an upper panel 6b, and a holder portion 6c. The films F are stored as a stack between the upper and lower panels 6a, 6b. The upper panel 6b is shorter than the lower panel 6b.

After the package 2 has been placed into a radiation image photographing device through a magazine or the like (not shown), the end 4a of the bag 4 is torn open, and then the other end 4b thereof is pulled in the direction of the arrow to remove the bag 4. The films F are now loaded in the radiation image photographing device, and will be delivered or fed by a suction cup 8 of a film delivery mechanism for recording images thereon.

The radiation image photographing device has a large depth since the films are loaded and delivered in the same direction in the radiation image photographing device. Where the radiation image photographing device is located in a small room, any remaining space available in that room cannot effectively be utilized for other purpose.

To allow the radiation image photographing device to be appropriately installed in a small space, the depth of the device may be reduced by feeding the films from the package in a direction substantially normal to the direction in which the films have been loaded. In this arrangement, the bag 4 of the conventional package 2 is pulled in a direction parallel to the holder portion 6c of the protective board 6. Therefore, upon such removal of the bag 4, the stored films F may also be removed with the bag 4, or the films F and the bag 4 may not smoothly be separated from each other.

If the holder portion 6c is positioned in the direction in which the bag 4 is removed for the purpose of preventing the films F from moving with the bag 4 upon its removal, the stacked films F will not effectively be fanned at the time of feeding the films F, and it is highly likely for a number of films F to be delivered at a time. More specifically, when a film F is to be fed, it is fanned so as to be separated from the film stack so that two or more films F will not be delivered together. With the protective board 6 arranged as shown, the film F to be fed will engage a side edge of the upper panel 6b of the protective board 6 and then fall down. Therefore, the film F cannot smoothly be delivered.

In the conventional arrangement, the protective board 6 has a hole 7 for preventing the suction cup 8 from continuously attracting the protective board 6 and hence from damaging a vacuum pump in the suction system connected to the suction cup 8, after all of the films F have been delivered out by the suction cup 8.

The projective sheet 6 is normally in the form of a hard sheet such as a highly rigid paper board or a synthetic resin sheet. Therefore, stored films F tend to have a pressure mark resulting from the profile of the hole 7. Moreover, the moisture or gas contained in the protective board 6 is apt to develop a fog on the films F. Fibers detached from the surface of the protective board 6 or the peripheral wall surface of the hole 7 are liable to be attached to the films F, presenting an obstacle to good image development or producing a spot on the developed image.

The films F protected by the protective board 6 are also caused to have pressure marks by the hole 7 during shipment thereof.

Where the protective board 6 is made of paper board such as unbleached kraft paper, for example, a harmful substance or gas discharged from the unbleached kraft paper tends to adversely affect the films F held against the protective board 6. In case the protective board 6 is made of bleached kraft paper, no harmful gas is emitted, but the moisture in the bleached kraft paper is likely to develop a fog on the films F in contact therewith or vary the sensitivity of the films F. Further, pressure marks are also impressed on the films F when they are under load.

SUMMARY OF THE INVENTION

It is a general object of the present invention to provide a sheet film package containing a plurality of sheet films protected by a protective board in a flexible bag-shaped light-shielding member, the protective board having a substantially J-shaped cross section and having a holder portion on one side thereof, so that the sheet films can smoothly be delivered or fed in a direction normal to the direction in which they are loaded, and the protective board having a foamed sheet layer, or a buffer sheet member having a foamed sheet layer being provided separately from the protective board, for preventing the sheet films in the sheet film package from having pressure marks.

A major object of the present invention is to provide a sheet film package comprising a flexible light-shielding member, a stack of sheet films stored in the light-shielding member, and a protective board disposed in the light-shielding member for protecting the sheet films, the protective board having upper and lower panels lying substantially parallel to each other in sandwiching relation to the sheet films, the upper panel being swingable in a direction in which the sheet films will be fed out, the protective board including a holder portion integrally joined to one side edge of the upper panel and/or the lower panel for preventing the sheet films from being displaced in a direction transverse to the direction in which the sheet films will be fed out.

Another object of the present invention is to provide a sheet film package wherein the protective board is of a substantially bent configuration, the upper panel being shorter than the lower panel in the direction in which the sheet films will be fed out.

Still another object of the present invention is to provide a sheet film package wherein the upper and lower panels are separate from each other and arranged in interdigitated relation to each other, defining therebetween a space accommodating the sheet films therein.

Yet another object of the present invention is to provide a sheet film package further including a buffer sheet member disposed on the lower panel of the protective board, the buffer sheet member having means for leaking suction air.

Yet still another object of the present invention is to provide a sheet film package wherein the means for leaking suction air comprises openings defined in the buffer sheet member.

A further object of the present invention is to provide a sheet film package wherein the buffer sheet member substantially comprises a sheet of foamed thermoplastic resin.

A yet further object of the present invention is to provide a sheet film package comprising a casing, a stack of sheet films stored in the casing, a protective board disposed in the casing for protecting the sheet films, and a buffer sheet member disposed on a lower panel of the protective board for placing the sheet films on the buffer sheet member, the buffer sheet member having at least one means for leaking suction air in each of two symmetrical areas of the buffer sheet member, one of which will be contacted by a suction cup of a film delivery mechanism disposed in a device in which the sheet film package can be loaded.

A still further object of the present invention is to provide a sheet film package wherein the means for leaking suction air comprises openings defined in the buffer sheet member.

A yet still further object of the present invention is to provide a sheet film package wherein the buffer sheet member has a foamed sheet layer.

It is also an object of the present invention to provide a sheet film package wherein the foamed sheet layer is substantially made of thermoplastic resin.

Another object of the present invention is to provide a sheet film package comprising a casing, a stack of sheet films stored in the casing, and a protective board disposed in the casing for protecting the sheet films, the protective board having a synthetic resin film layer held against the sheet films, a foamed sheet layer disposed on the synthetic resin film layer and having an expansion ratio ranging from 2 to 50, and a support layer disposed on the foamed sheet layer.

Still another object of the present invention is to provide a buffer sheet member for use with a sheet film package for loading a stack of sheet films into a device having a film delivery mechanism including a suction cup, the buffer sheet member having at least one means for leaking suction air in each of two symmetrical areas of the buffer sheet member, one of which will be contacted by the suction cup.

A further object of the present invention is to provide a buffer sheet member wherein the means for leaking suction air comprises openings defined in the buffer sheet member.

A still further object of the present invention is to provide a buffer sheet member wherein the buffer sheet member has a foamed sheet layer.

A yet still further object of the present invention is to provide a buffer sheet member wherein the foamed sheet layer is substantially made of thermoplastic resin.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 2:
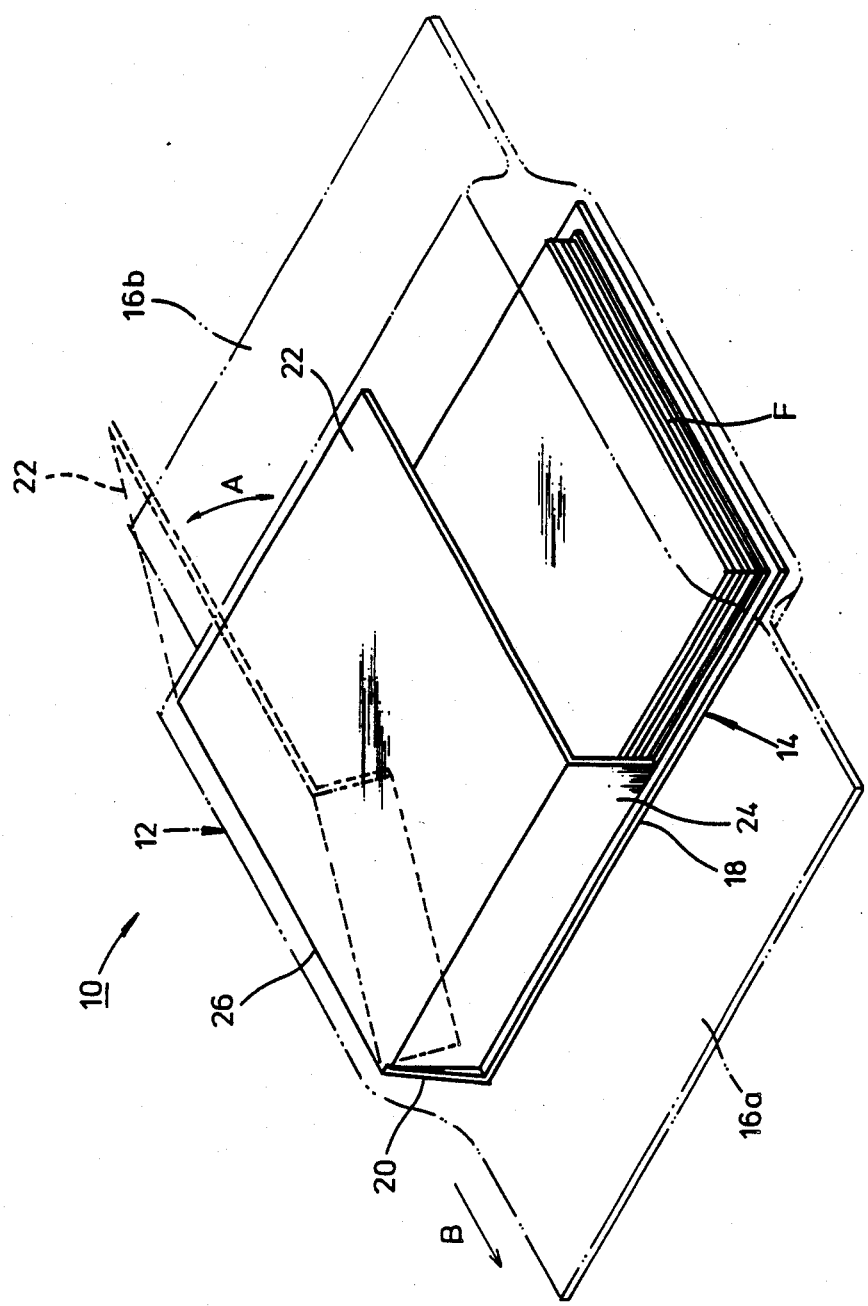
FIG. 2 is a perspective view of a sheet film package according to the present invention.

As shown in FIG. 2, a sheet film package 10 according to the present invention comprises a container or casing 12 comprising a flexible light-shielding member indicated by the two-dot-and-dash lines and a protective board 14 for protecting photosensitive films F stored in the light-shielding member 12. The light-shielding member 12 is in the form of a bag with its opposite ends 16a, 16b hermetically closed off.

The protective board 14 is made of cardboard paper, for example, which is of a bent configuration. The protective board 14 includes a lower panel 18, a side panel 20 extending vertically upwardly from one side edge of the lower panel 18 in substantially perpendicular relation thereto, and an upper panel 22 extending substantially parallel to the lower panel 18 from an upper edge of the side panel 20, the upper panel 22 being shorter than the lower panel 18. A holder portion 24 is bent downwardly from one side edge of the upper panel 22 toward the lower panel 18. The holder portion 24 is positioned near the end 16a of the light-shielding member 12. The upper panel 22 and the holder portion 24 are swingable in the direction of the arrow A about the juncture or pivot 26 between the upper panel 22 and the side panel 20, as indicated by the broken lines.

The sheet film package of the present invention is basically constructed as described above. An image recorder for loading the sheet film package 10 therein and recording images on the sheet films F will be described below.

Figure 3:
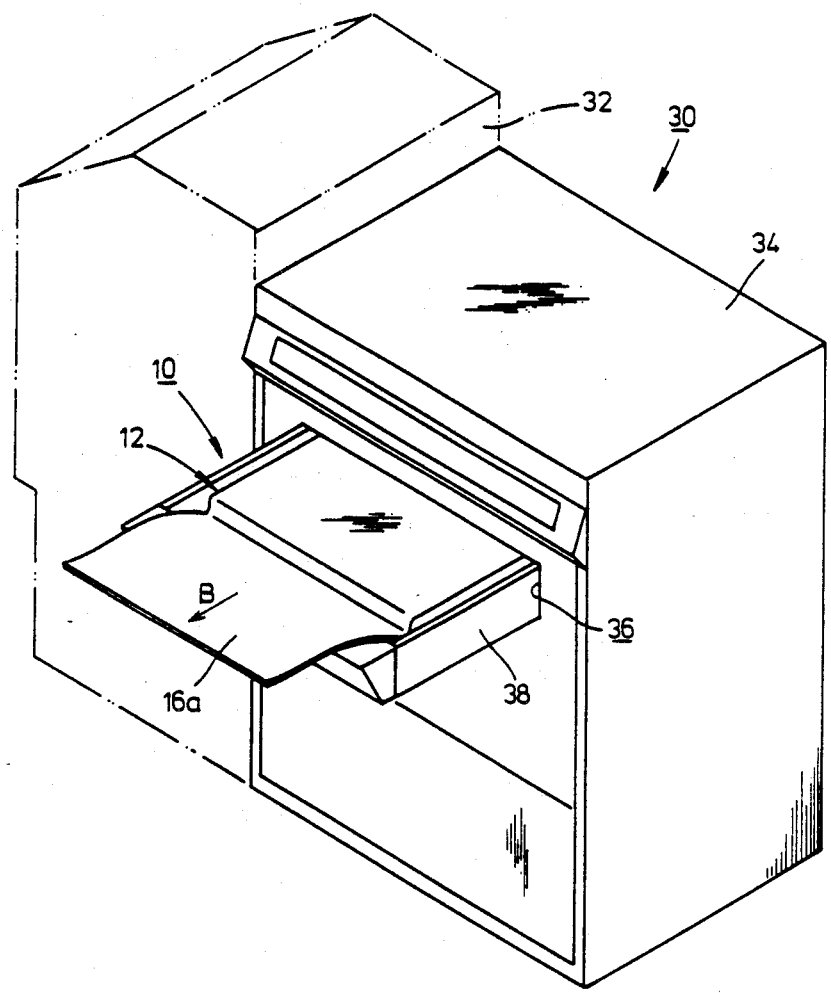
FIG. 3 is a perspective view of the sheet film package and a device into which the sheet film package is loaded.
Figure 4:
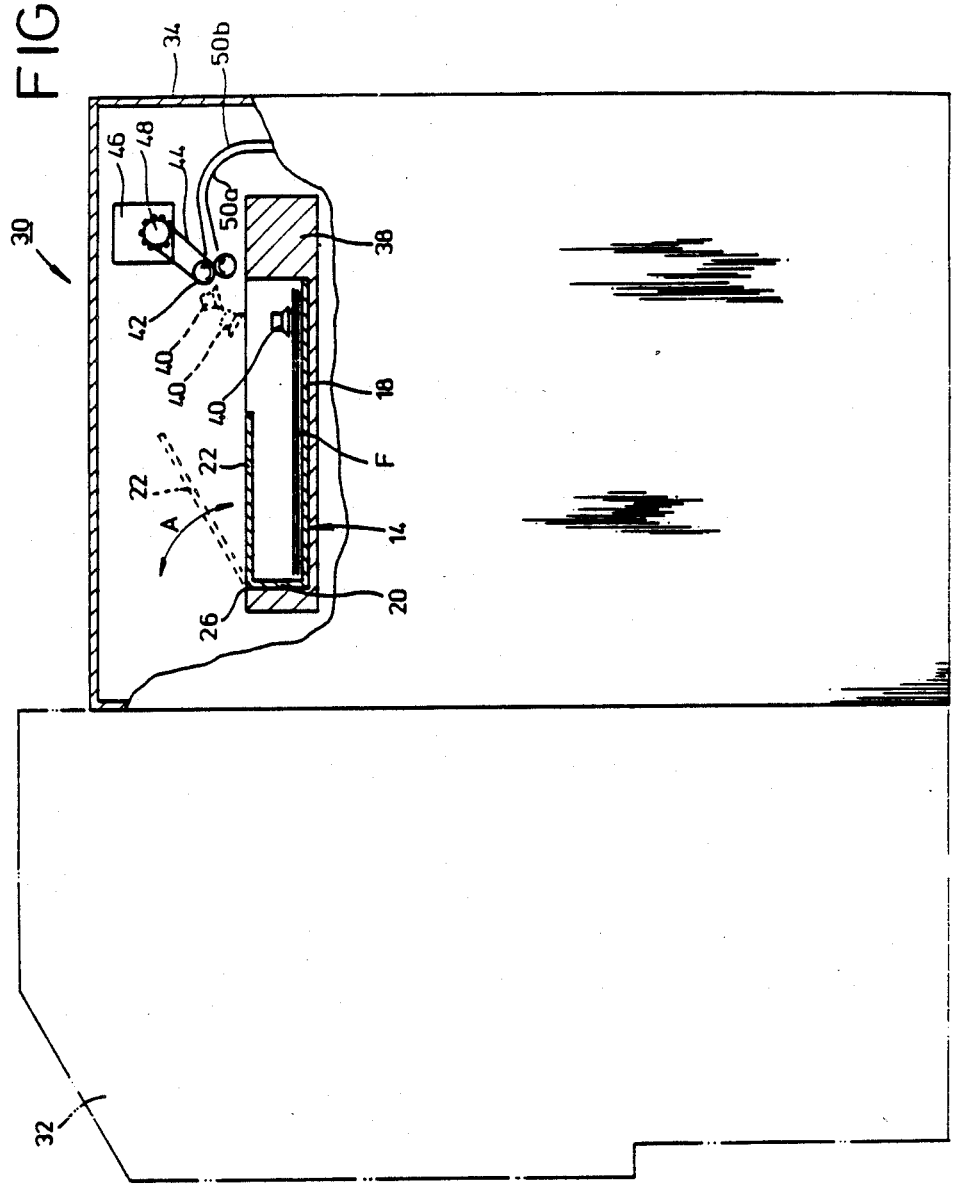
FIG. 4 is a fragmentary cross-sectional view of the device shown in FIG. 3.

As illustrated in FIGS. 3 and 4, an image recorder 30 and an automatic image developing device 32 are disposed adjacent to each other.

In FIG. 3, the image recorder 30 includes a housing 34 having a film loading slot 36 defined in a side panel thereof. The sheet film package 10 is loaded in a tray 38 which is removably fitted in the film loading slot 36. With the sheet film package 10 thus placed in the tray 38, the end 16a of the light-shielding member 12 extends out of the tray 38. When the tray 38 is inserted in the image recorder 30, the interior space in the image recorder 30 is completely shielded from extraneous light.

As shown in FIG. 4, a suction cup 40 serving as a sheet delivery or feed mechanism is disposed in the housing 34 near the tray 38. As indicated by the broken lines, the suction cup 40 is displaced along a track toward a film feed roller pair 42. Thus, a film F located in the tray 38 will be fed from the tray 38 in a direction substantially normal to the direction in which the tray 38 is pulled out.

One roller of the roller pair 42 is connected to a sprocket (not shown). A chain 44 is trained around this sprocket and another sprocket 48 mounted on the drive shaft (not shown) of a rotative drive source 46. Guide members 50a, 50b are disposed adjacent to the roller pair 42 for guiding a film F fed by the roller pair 42 toward a scanning recording unit (not shown). After a desired image has been recorded on the film F by the scanning recording unit, the image recorder 30 delivers the film F into the automatic image recording device 32.

A process of loading the sheet film package 10 into the image recorder 30 will now be described.

As shown in FIG. 3, the tray 38 of the image recorder 30 is pulled out, and the sheet film package 10 is loaded into the opening in the tray 38. At this time, the end 16a of the light-shielding member 12 is placed out of the tray 38, as described above. Then, the tray 38 is inserted into the image recorder 30.

The other end 16b of the light-shielding member 12 is cut off by a cutter (not shown) in the image recorder 30, and then the exposed end 16a is pulled in the direction of the arrow B to remove the light-shielding member 12. At this time, the films F tend to be displaced in a direction out of the image recorder 30, i.e., in the direction of the arrow B, upon removal or movement of the light-shielding member 12 in the direction of the arrow B. However, such displacement of the films F is prevented by the holder portion 24 of the protective board 14.

After the films F have been loaded in the image recorder 30, the films F are delivered or fed one by one by the suction cup 40. The suction cup 40 fans the uppermost film F to prevent two or more successive films F from being delivered. During such fanning of the film F, the film F may engage the upper panel 22 of the protective board 14. However, since the upper panel 22 can swing in the direction of the arrow A about the joint 26 between the upper panel 22 and the side panel 20, the upper panel 22 does not obstruct the fanning action of the suction cup 40. As a result, the suction cup 40 can feed the films F smoothly one at a time.

As the suction cup 40 is displaced along the track as indicated by the broken lines in FIG. 4, the film F attracted by the suction cup 40 is delivered until it is gripped by the roller pair 42. Then, the sprocket 48 is rotated by the rotative drive source 46 to cause the chain 44 to rotate the roller pair 42 in the directions of the arrows. Therefore, the film F gripped by the roller pair 42 is sent into the scanning recording unit while being guided by the guide members 50a, 50b. A desired image is recorded on the film F in the scanning recording unit, and then the film F is fed into the automatic image developing device 32 located adjacent to the image recorder 30. In the automatic image developing device 32, the image on the film F is developed and fixed, and then the film F is washed and dried. Thereafter, the film F will be used as a film plate for various applications.

Figure 5:
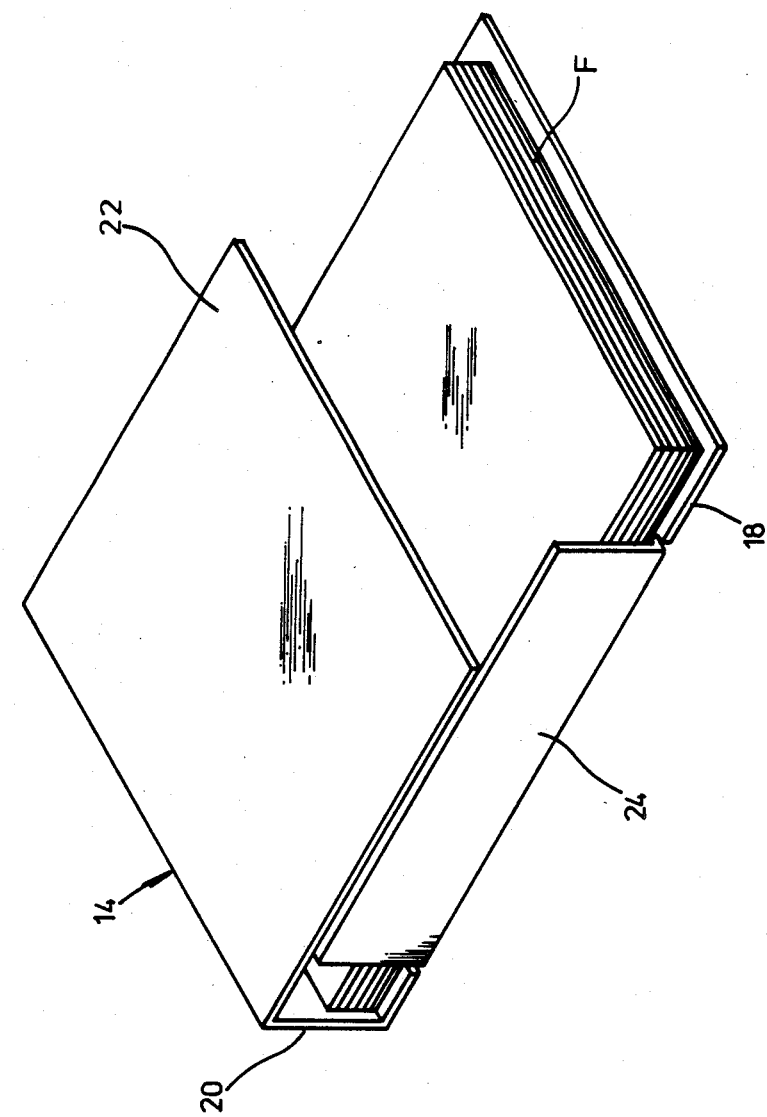
FIGS. 5 through 9 are perspective views of sheet film packages according to other embodiments of the present invention.
Figure 6:
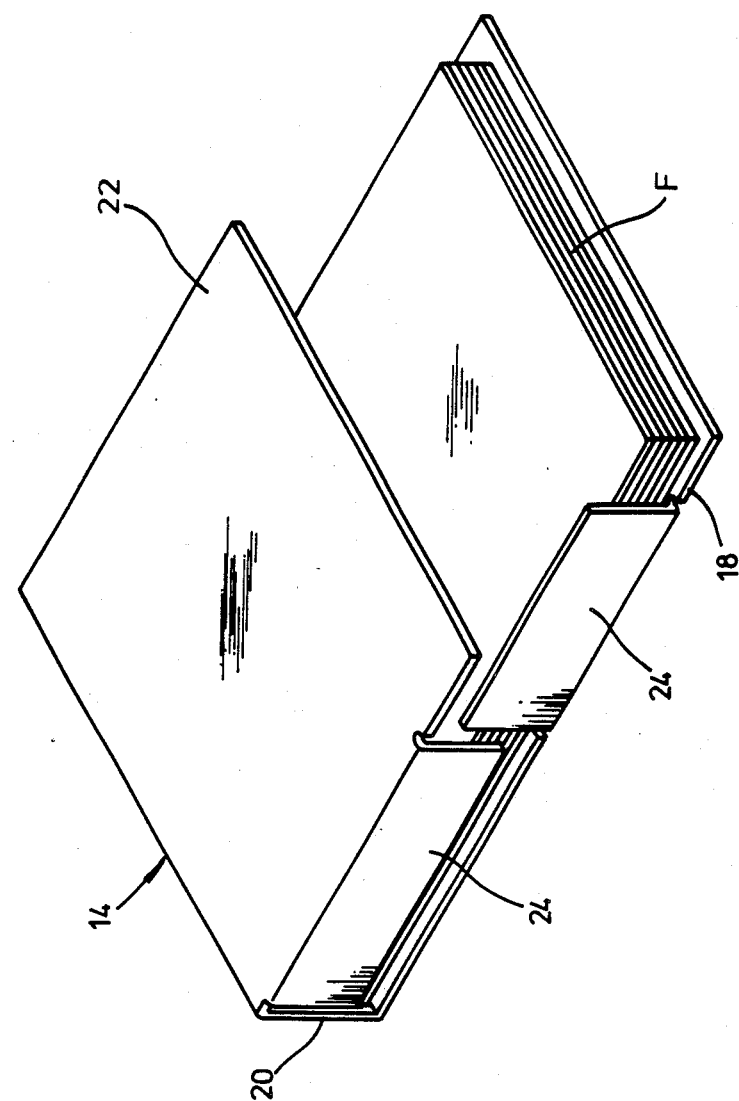

In the aforesaid embodiment, the holder portion 24 is joined to the upper panel 22 of the protective board 14. However, the holder portion 24 may be joined to the lower panel 18 as shown in FIG. 5, or two holder portions 24 may be joined to the upper and lower panels 22, 18, respectively, as shown in FIG. 6.

Figure 7:
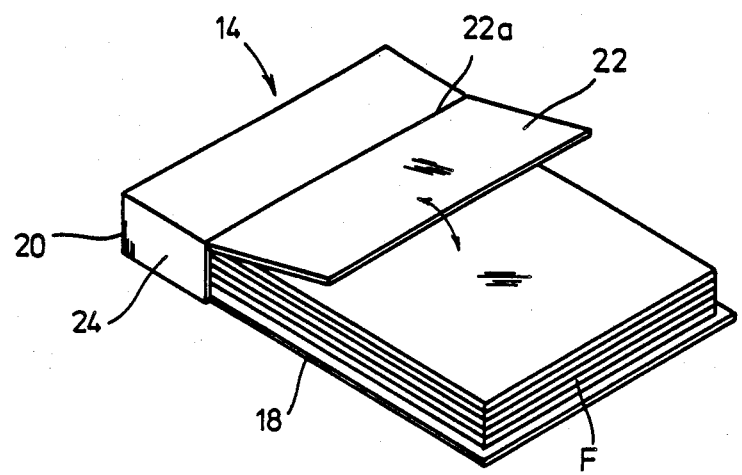

Alternatively, as shown in FIG. 7, a relatively short holder portion 24 may be fixed to one ends of the lower and upper panels 18, 22. The upper panel 22 has an opposite end portion swingable about a fold 22a. When a film F is delivered by the suction cup 40, the film F can smoothly be fed even if the suction cup 40 displaces the film F upwardly since the end portion of the upper panel 22 can freely swing upwardly about the fold 22a.

Figure 8:
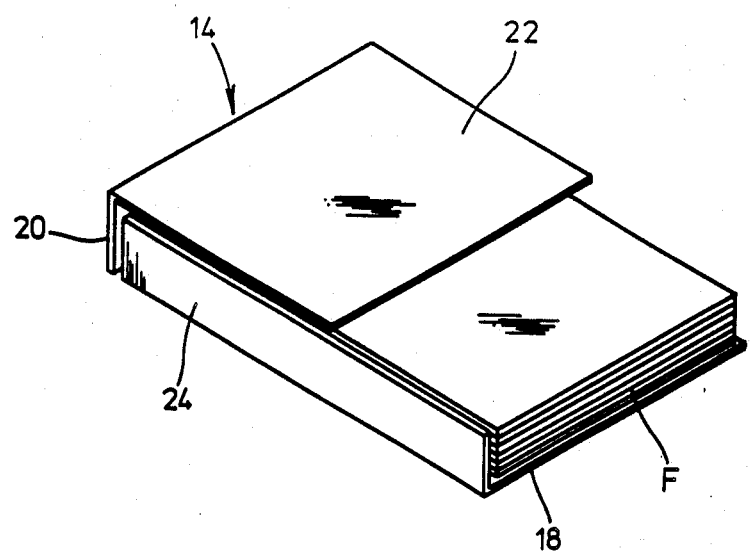
Figure 9:
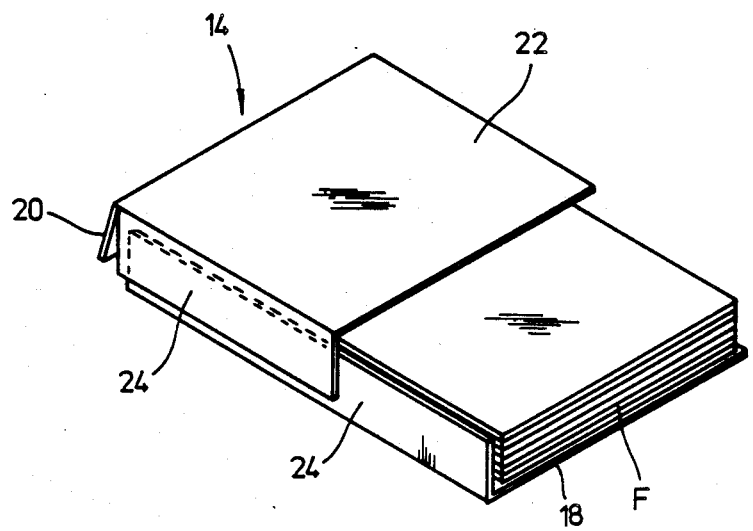

FIGS. 8 and 9 show protective boards 14 according to other embodiments of the present invention. In these embodiments, upper and lower panels 18, 22 are separate from each other. In FIG. 8, one side of a lower panel 18 is bent upwardly substantially at a right angle into a holder portion 24, and one end of a separate upper panel 22 is bent downwardly into a side panel 20. These holder portion 24 and the side panel 20 are interdigitated to define a space for accommodating films F therein. A protective board 14 shown in FIG. 9 is similar to the protective board 14 of FIG. 8 except that a holder 24 is also joined to one side of the upper panel 22. With the arrangements of these embodiments, the process of manufacturing the protective board 14 is simplified, and the protective board 14 does not obstruct sheet delivery operation of the suction cup 40.

In the aforesaid embodiments of the present invention, it is possible to use a buffer sheet member for preventing the stored films F from having pressure marks. The buffer sheet member is preferably in the form of a foamed sheet which may be formed, by using a foaming agent, from any of various polyolefins such as polyethylenes, polypropylenes, and polybutenes, any of various ethylene copolymers such as ethylene-propylene copolymer, ethylenebutene copolymer, ethylene-vinyl-acetate copolymer, and ethylene-acrylic-ester copolymer, copolymer wherein ethylene is a main component such as chlorinated polyethylene, copolymer wherein propylene is a main component, polyamide, a mixture of two or more of the above resins, polyurethane, natural rubber (spongy material manufactured from rubber-producing latex), SBR, or the like. Alternatively, the buffer sheet member may be made from paper, nonwoven fabric, synthetic paper, or the like which has a density of 0.9 g/cm² or less, preferably 0.8 g/cm² or less.

The preferable foamed sheet which can effectively be employed in the present invention comprises a thermoplastic resin foamed sheet formed from, as a main component, polystyrene, any of various high-, medium-, and low-density polyethylenes, linear low-density polyethylene (L-LDPE), polypropylene, propylene-ethylene copolymer, ethylene-vinyl-acetate copolymer, or ethylene-acrylic-ester copolymer. Particularly, a foamed polystyrene sheet (foamed polystyrene paper) and a foamed polyethylene sheet are suitable in view of their characteristics and the cost of manufacture.

The thermosplastic resin includes a modified, cross-linked, or radiation-exposed resin.

The expansion ratio of the foamed sheet is selected to meet the intended application of the sheet since it has a large effect on the dust resistance, cushioning capability, slippage, and mechanical strength of the sheet. It is preferable to have an expansion ratio in the range of from 2 to 50. If the expansion ratio were in excess of 50, the mechanical strength of the foamed sheet would be lowered to a large extent, causing separation between itself and films F stacked thereon. If the expansion ratio were smaller than 2, the shock resistance, particularly the Gelbo test strength, would be reduced, other characteristics of the foamed sheet would be lost, and the cost would be increased.

The buffer sheet member may be a single-layer buffer sheet, or a laminated sheet comprising a buffer sheet to which any of various films or a dust-free sheet such as a cellophane film, a sheet of glassine paper, a sheet of synthetic paper, or the like is attached, or a laminated sheet produced by multilayer coextrusion. A preferable buffer sheet member should have any of various sheets and/or a dust-free sheet which has an irregular surface. For dust-free capability and various better characteristics, the surface layer of the buffer sheet member should be a dust-free sheet. For a buffer sheet member having a foamed sheet of synthetic resin on its surface, the expansion ratio of the foamed sheet as the surface layer should be 2 or less for dust resistance.

A buffer sheet member in the form of a laminated sheet including any of various films can be formed by a thermal bonding process (such as a thermal plate bonding process, a flame-treatment bonding process, a hot-air-heating bonding process, an impulse sealing process, or an ultrasonic welding process) or a processing using an adhesive (such as a wet laminating process, a dry laminating process, hot-melt laminating process, an extrusion laminating process, or a coextrusion laminating process).

Typical adhesives that can be used include thermoplastic thermally fusible adhesives comprising polyolefins such as polyethylenes, polypropylenes, or polybutenes, thermoplastic thermally fusible adhesives comprising ethylene copolymers such as ethylene-propylene copolymers, ethylene-vinyl-acetate copolymers, or ethylene-ethyl-acrylate copolymers, ethylene-acrylic-acid copolymers, or ionomers, and thermally fusible adhesives comprising rubber. Solution-type adhesives that can be used include wet laminating adhesives which are in the form of an emulsion or latex. Typical emulsion adhesives include emulsions of polyvinyl acetate, vinyl-acetate-ethylene copolymer, copolymer of vinyl acetate and acrylic acid ester, copolymer of vinyl acetate and maleic acid ester, acrylic acid copolymer, and ethylene-acrylic-acid copolymer. Latex adhesives that can be used include rubber latexes of natural rubber, styrene-butadiene rubber (SBR), acrylonitrile-butadiene rubber (NBR), and chloroprene rubber (CR). Dry laminating adhesives include polyurethane adhesives. Moreover, known adhesives such as hot-melt laminating adhesives in the form of a blend of paraffin wax, microcrystalline wax, ethylene-vinyl-acetate copolymer, and ethylene-ethylacrylate copolymer, pressure-sensitive adhesives, and heat-sensitive adhesives may also be used. Extrusion laminating polyolefin-base adhesives that can be used include polyolefins such as polyethylenes, polypropyrenes, and polybutylenes, ethylene copolymers (EVA, EEA, EMA, EAA, and the like), copolymers of ethylene and another monomer ($\alpha$-olefin) such as L-LDPE, SURLYN manufactured by DuPont, ionomers (ion copolymers) such as Hi-miran manufactured by Mitsui Polychemical, and ADMER which is an adhesive polyolefin manufactured by Mitsui Petrochemical.

The protective board 14 may comprise any of the various forms as described above. From the standpoint of keeping the quality of and protecting the films F, the protective board 14 should preferably be in the form of a sheet of base paper made of semibleached of bleached pulp or a synthetic resin sheet, having a thickness of 200 micrometers or greater.

Other than the protective boards 14 of the types described above, protective boards disclosed in Japanese Laid-Open Patent Publications Nos. 59-52244, 59-86518, 59-31950, 59-31951, 59-34535, and 56-40535 may also be employed.

Various additives may be added to the buffer sheet member and the protective board.

Typical examples of such additives are described below. However, the present invention is not limited to these additives, but any of known additives may be used.

| Additive type | Examples |
| --- | --- |
| (1) Plasticizer: | phthalate ester, glycol ester, fatty acid ester, and phosphoric ester |
| (2) Stabilizer: | lead, cadmium, zinc, alkaline earth metal, and organic tin stablizers |
| (3) Antistatic agent: | cationic surfactant, anionic surfactant, nonionic surfactant, amphoteric surfactant, various types of carbon black, metallic powder, and graphite |
| (4) Flame retardant: | phosphoric ester, halogenated phosphoric ester, halide, inorganic flame retardant, phosphorous polyol |
| (5) Filler: | almina, kaolin, clay, calcium carbonate, mica, talc, titanium oxide, silica |
| (6) Reinforcing agent: | glass roving, metallic fibers, glass fibers, milled glass fibers, carbon fibers |
| (7) Colorant: | inorganic pigment (Al, $Fe_2O_3$, $TiO_2$, ZnO, CdS, etc.), organic pigment (carbon black, dye, etc.) |
| (8) Foaming agent: | inorganic foaming agent (ammonium carbonate, sodium bicarbonate), organic foaming agent (nitron, azo foaming agent) |
| (9) Vulcanizing agent: | vulcanization accelerator, accelerator assistant |
| (10) Deterioration inhibitor: | ultraviolet absorber, antioxidant, metal inactivating agent, peroxide decomposer |
| (11) Lubricant: | paraffin, wax, fatty acid, fatty acid amide, silicone, ester, higher alcohol |
| (12) Coupling agent: | silane, titanate, chromium, aluminum coupling agent |
| (13) Various thermoplastic resins, rubber | |

Figure 1:
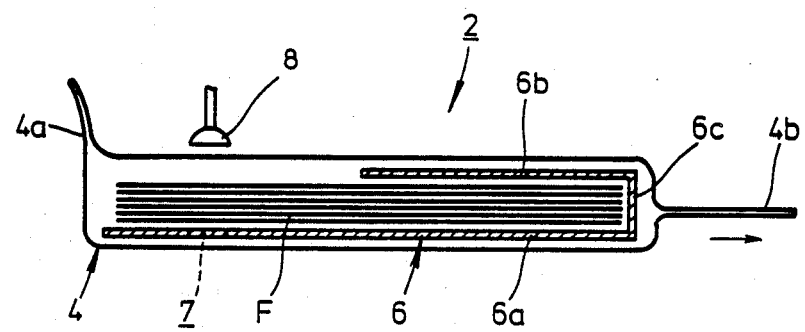
FIG. 1 is a schematic vertical cross-sectional view of a conventional sheet film package.
Figure 10:
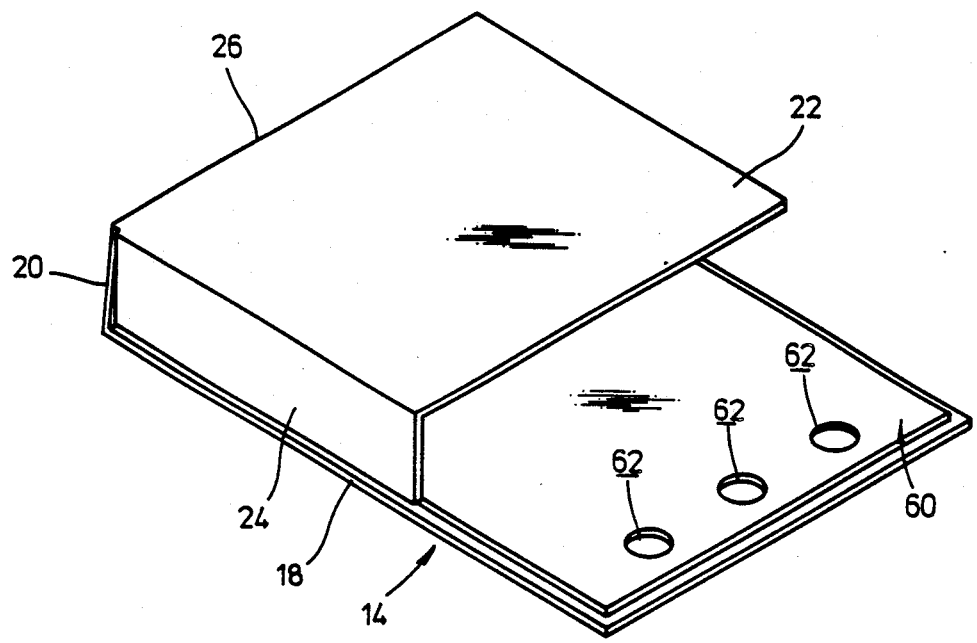
FIG. 10 is a perspective view of a protective board and a buffer sheet member attached thereto, for use with a sheet film package of the present invention.

A buffer sheet member 60 (FIG. 10) is disposed on the lower panel 18 of any of the protective boards 14, e.g., the protective board 14 according to the first embodiment shown in FIG. 1. The buffer sheet member 60 and the protective board 14 may be entirely or partly bonded to each other by an adhesive tape or an adhesive, or alternatively the buffer sheet member 60 may merely be placed on the protective board 14. The buffer sheet member 60 covers the lower panel 18 substantially in its entirety. The buffer sheet member 60 has a plurality of holes 62 defined therein in an arear which will be contacted by the suction cup 40 of the image recorder 30, the holes 62 serving as means for leaking air when the buffer sheet member 60 is attracted by the suction cup 40. Where there is a space between the protective board 14 and the buffer sheet member 60, the holes 62 may be located within the attracting surface of the suction cup 40. However, where the protective board 14 and the buffer sheet member 60 are fully in contact with each other, the holes 62 should not be located fully within the attracting surface of the suction cup 40, but should partly be positioned out of the attracting surface of the suction cup 40. The holes 62 may be of any of various shapes such as a circle, a triangle, a square, a rectangle, a slit, a star, a tortuous slit, and the like. The surface of the buffer sheet member 60 may alternatively be made irregular to provide means for leaking air.

Various layer structures for the buffer sheet member 60 are shown in FIGS. 11 through 18.

Figure 11:
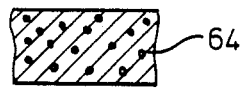
FIGS. 11 through 18 are fragmentary cross-sectional views showing different layer structures for the buffer sheet member.

FIG. 11 shows a buffer sheet member comprising a single layer 64 in the form of a foamed sheet.

Figure 12:
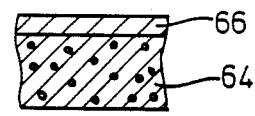

FIG. 12 illustrates a buffer sheet member comprising a foamed sheet layer 64 and a flexible sheet layer 66 deposited directly on one surface thereof.

Figure 13:
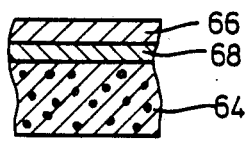

A buffer sheet member shown in FIG. 13 comprises a foamed sheet layer 64 and a flexible sheet layer 66 bonded to one surface thereof by an adhesive layer 68 therebetween.

Figure 14:
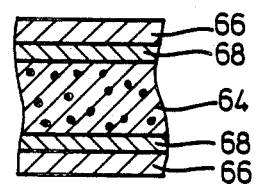

A buffer sheet member shown in FIG. 14 comprises a foamed sheet layer 64, and two flexible sheet layers 66 bonded to respective opposite surfaces thereof by respective adhesive layers 68 therebetween.

Figure 15:
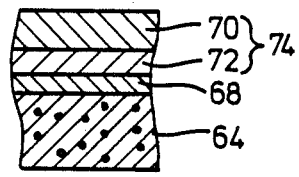

According to an embodiment shown in FIG. 15, a laminated extruded film layer 74 comprising an HDPE film layer 70 and an L-LDPE film layer 72 is positioned on one side of a foamed sheet layer 64 where films F are placed. The extruded film layer 74 is bonded to the foamed sheet layer 60 by an adhesive layer 68.

Figure 16:
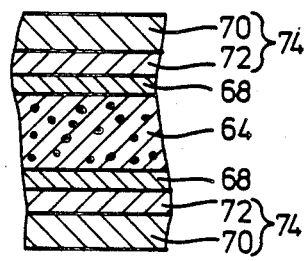

In FIG. 16, two laminated extruded film layers 74 each comprising an HDPE film layer 70 and an L-LDPE film layer 72 are bonded respectively to the opposite surfaces of a foamed sheet layer 64 by respective adhesive layers 68.

Figure 17:
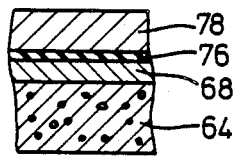

FIG. 17 shows a buffer sheet member including a biaxially oriented plastic film layer 78 with an aluminum layer 76 deposited thereon by vacuum deposition, the plastic film layer 78 being bonded to one surface of a foamed sheet layer 64 by an adhesive layer 68.

Figure 18:
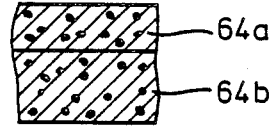

FIG. 18 illustrates a buffer sheet member comprising a foamed sheet layer 64a of a low expansion ratio on a side to be contacted by films F and a foamed sheet layer 64b of a high expansion ratio on the opposite side to be contacted by a protective board 14.

The sheet film package 10 having the buffer sheet member 60 thus constructed is loaded into the image recorder 30, and the sheet films 10 contained therein are fed one by one in the manner described above.

Since the buffer sheet member 60 is disposed on the protective board 14, it is easily possible to detect when all of the films F have been fed out. More specifically, after all of the films F have been delivered out, the suction cup 40 faces the holes 62 defined in the buffer sheet member 60. Air is therefore drawn from the holes 62 into the suction cup 40, and hence no vaccum is developed in the suction cup 40. By detecting the pressure in the suction cup 40, therefore, it is possible to easily confirm that all of the films F have been delivered out. Since the suction cup 40 is vented to atmosphere through the holes 62, the vacuum pump or other vacuum source coupled to the vacuum cup 40 is prevented from being damaged.

The buffer sheet member 60 is also effective to prevent the films F from being damaged when they are fed. More specifically, according to the conventional arrangements, the protective board made of relatively hard cardboard paper has a hole or an irregular surface for detecting when all of the films F have been fed out. The films F therefore tend to be abraded by the irregular surface of the protective board. The films F are liable to have a fog due to the pressure of their own or the moisture in the protective board, with the result that the film F will have a mark in the shape of the profile of the hole defined in the protective board. According to the present invention, the buffer sheet member 60 with which the films F are in contact is flexible since it is made of a foamed synthetic resin material. Consequently, any mark in the shape of the profile of the holes 62 defined in the buffer sheet member 60 will not be produced on the films F, and hence the films F can be delivered out without being damaged.

FIGS. 19 through 24 show various buffer sheet members according to other embodiments and various sheet film packages including such buffer sheet members.

Figure 19:
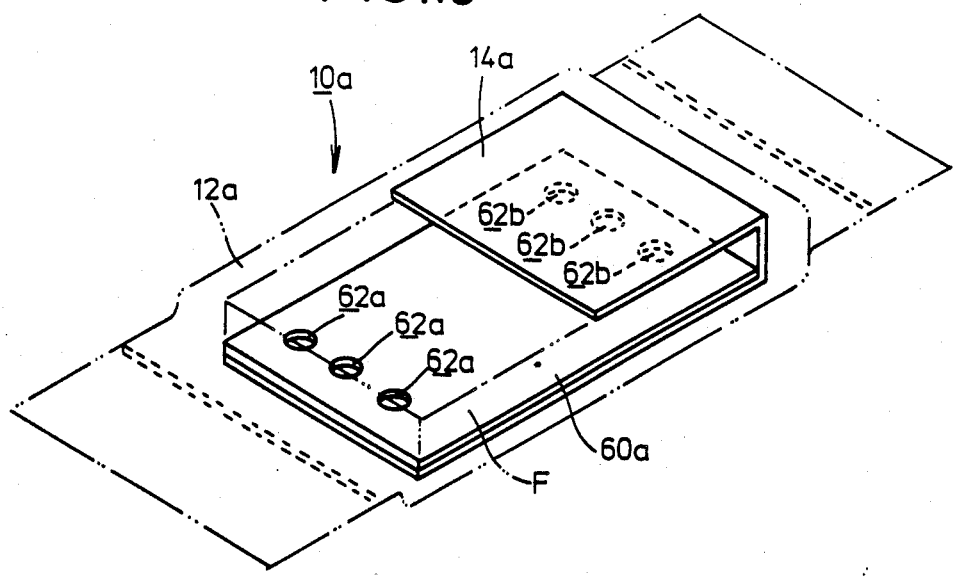
FIG. 19 is a perspective view of a sheet film package according to still another embodiment of the present invention.

In FIG. 19, a sheet film package 10a comprises a light-shielding member 12a containing a protective board 14a of a substantially J-shaped cross section having a shorter upper panel and a longer lower panel, the protective board 14a being in the form of a paper board having a thickness of 450 micrometers. A buffer sheet member 60a is disposed on the bottom or lower panel of the protective board 14a in covering the substantially entire area of the lower panel. The buffer sheet member 60a has three holes 62a defined therein near one shorter side edge and other three holes 62b defined therein near the other shorter side edge, the holes 62a, 62b serving as means for leaking air. Therefore, irrespective of whether the buffer sheet member 60a is oriented in one direction or the other on the protective board 14a, the holes 62a or the holes 62b are positioned for coaction with the suction cup 40. The holes 62a, 62b are circular in shape, and have a diameter of 30 mm.

Figure 20:
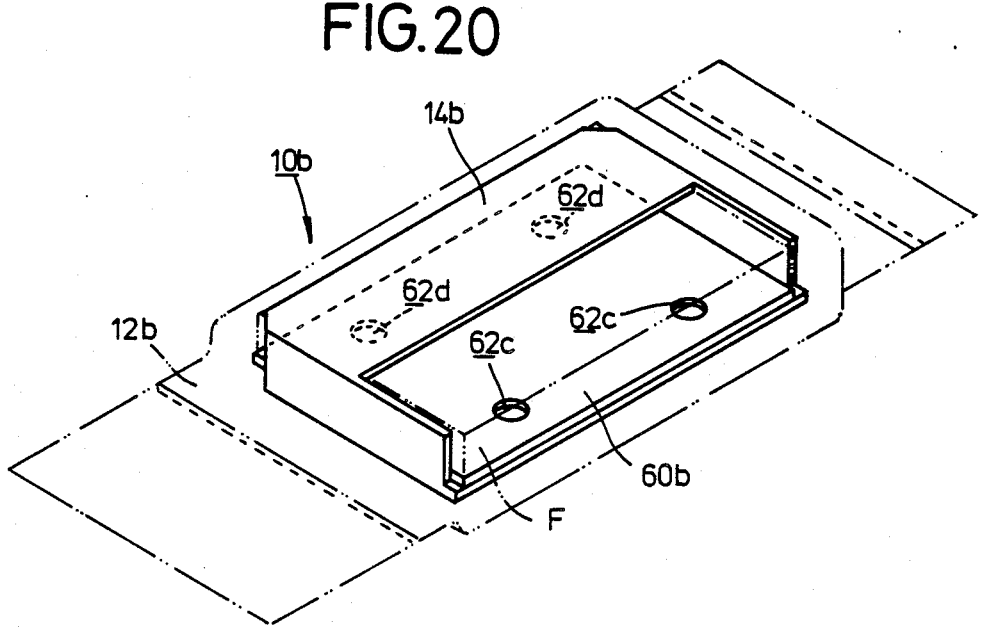
FIG. 20 is a perspective view of a sheet film package according to a further embodiment of the present invention.

Another sheet film package 40b shown in FIG. 20 includes a protective board 14b comprising a paper board having a thickness of 450 micrometers, the protective board 14b being in the form of a box having one side and a contiguous upper side open. The buffer sheet member 60b is disposed on the lower panel of the protective board 14b and has two holes 62c defined therein near one longer side edge and two holes 62d defined therein near the other longer side edge. The holes 62c, 62d serve as means for leaking air. Irrespective of whether the buffer sheet member 60b is oriented in one direction or the other on the protective board 14b, the holes 62c or the holes 62d are positioned for coaction with the suction cup 40.

Figure 21:
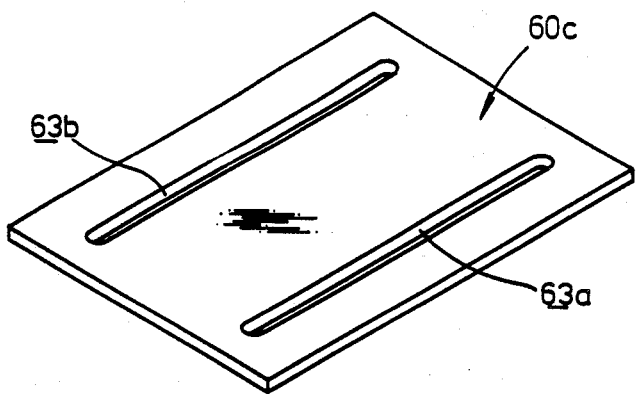
FIGS. 21 through 24 are perspective views of buffer sheet members according to other embodiments of the present invention.

FIG. 21 shows a buffer sheet member 60c having as air leaking means two slits 63a, 63b defined longitudinally therein near opposite longer side edges, respectively, each of the slits 63a, 63b having a width of 3 mm and a length of 17 cm. The buffer sheet member 60c is used mainly on the protective board 14b shown in FIG. 20.

Figure 22:
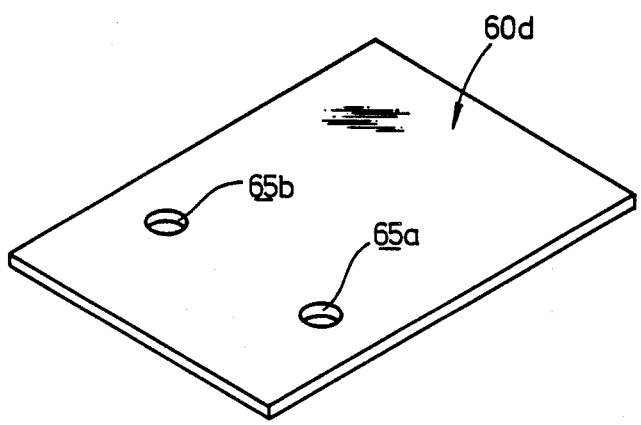

FIG. 22 illustrates a buffer sheet member 60d having as air leaking means two elliptical holes 65a, 65b defined therein near the corners at one shorter side edge, each of the holes 65a, 65b having a major axis which is 25 mm long and a minor axis which is 35 mm long. The buffer sheet member 60d is used on the protective board 14b shown in FIG. 20.

Figure 23:
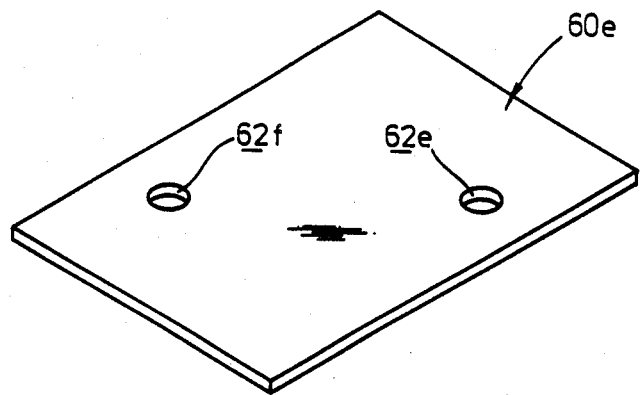

A buffer sheet member 60e shown in FIG. 23 has as air leaking means two circular holes 62e, 62f defined therein near the corners on one diagonal line, each of the holes 62e, 62f having a diameter of 30 mm. The buffer sheet member 60e is used on both of the protective boards 14a, 14b shown in FIGS. 19 and 20.

Figure 24:
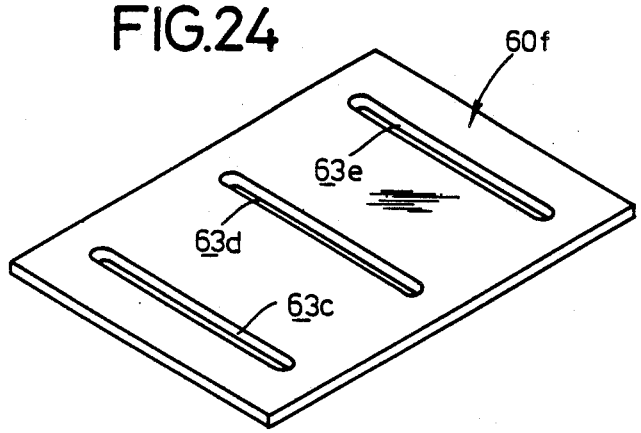

According to an embodiment shown in FIG. 24, a buffer sheet member 60f having as air leaking means three slits 63c, 63d, 63e defined therein parallel to the shorter side edges at positions near the shorter side edges and centrally therebetween, each of the slits 63c, 63d, 63e having a width of 3 mm and a length of 15 cm. The buffer sheet member 60f is used on both of the protective boards 14a, 14b shown in FIGS. 19 and 20.

The buffer sheet members 60a through 60f illustrated in FIGS. 19 through 24 may also have any of the layer structures shown in FIGS. 11 through 18.

The results of an experiment conducted on Inventive examples I, II, III, Comparative example I, and Conventional examples I, II, III will be described below.

Inventive Example I

This example employed sheet film package 10a shown in FIG. 19, and the buffer sheet member 60a had the layer structure shown in FIG. 16. The foamed sheet layer 64 was a foamed polyethylene sheet having a thickness of 1 mm and an expansion ratio of 30. The film layer 70 was made of HDPE to which there were added 3 weight % of carbon black and 0.05 weight % of an olefin acid amide lubricant. The HDPE film layer 70 had a thickness of 25 micrometers. The L-LDPE film layer 72 was made of a copolymer of ethylene and 4-methylpentene-1 to which there were added 3 weight % of carbon black and 0.05 weight % of an olefin acid amide lubricant. The L-LDPE film layer 72 was 25 micrometers thick. The adhesive layer 68 was made of LDPE and had a thickness of 15 micrometers.

As shown in FIG. 19, the buffer sheet member 60a had three holes 62a and three holes 62b defined therein near the respective shorter side edges and arranged symmetrically with respect to the longitudinal direction of the buffer sheet member 60a. Each of the holes 62a, 62b was circular in shape and 30 mm across.

The protective board 14a comprised a paper board of bleached pulp having a thickness of 400 micrometers.

The light-shielding member 12a was composed of an aluminum foil having a thickness of 7 micrometers and two L-LDPE film layers attached respectively to the opposite surfaces of the aluminum foil by respective adhesive layers of LDPE each having a thickness of 15 micrometers. Each of the L-LDPE film layers had a thickness of 50 micrometers. To each of the L-LDPE film layers were added 3 weight % of carbon black and 0.1 weight % of an olefin acid amide lubricant.

The buffer sheet member 60a was not fixed to the protective board 14a, but was placed in a free state between the protective board 14a and the films F.

Inventive Example II

This example employed the sheet film package 10b shown in FIG. 20, and the buffer sheet member 60b had the same layer structure as that of Inventive example I.

The buffer sheet member 60b had two circular holes 62c and two circular holes 62d each having a diameter of 30 mm, as shown in FIG. 20.

The protective board 14b and the light-shielding member 12b were identical in structure to those of Inventive example I, with the buffer sheet member 60b placed in a free state between the protective board 14b and the films F.

Inventive Example III

This example employed the protective board 14b illustrated in FIG. 20, and the buffer sheet member 60c shown in FIG. 21 which had the layer structure of FIG. 17.

The foamed sheet layer 64 was a foamed polyethylene sheet having a thickness of 0.5 mm and an expansion ratio of 20. The deposited aluminum layer 76 had a thickness of 400 Å. The biaxially oriented film layer 78 was made of polyester and had a thickness of 15 micrometers. The adhesive layer 68 was made of LDPE and had a thickness of 15 micrometers.

The buffer sheet member 60c had two slits 63a, 63b defined therein, as shown in FIG. 21, and each having a width of 3 mm and a length of 17 cm.

The protective board 14b was composed of a polypropylene sheet, 200 micrometers thick. The buffer sheet member 60c was placed in a free state between the protective board 14b and the films F, as with Inventive examples I, II.

Comparative Example I

This example was essentially the same as Inventive example II, except that the buffer sheet member 60b had two holes 62c defined therein only at one side thereof for coaction with the suction cup 40.

Conventional Example I

The protective board was in the form of a paper board of bleached pulp having a thickness of 450 micrometers. No holes were defined in the protective board.

The light-shielding member comprised an LDPE film layer having a thickness of 70 micrometers with 3 weight % of carbon black added thereto, an aluminum foil having a thickness of 7 micrometers, and a sheet of bleached kraft paper of 35 g/cm² having a thickness of 15 micrometers, the aluminum foil and the sheet of bleached kraft paper being bonded to the LDPE film layer by an LDPE adhesive layer which was 15 micrometers thick.

Conventional Example II

The protective board was in the form of a paper board of bleached pulp having a thickness of 450 micrometers. The buffer sheet member had three holes defined therein and each having a diameter of 30 mm, similar to the holes 62a of the buffer sheet member 60a of Inventive example I.

The light-shielding member was the same as that of Conventional example I.

Conventional example III

The protective board was in the form of a polypropylene sheet having a thickness of 300 micrometers. The buffer sheet member had three holes defined therein and each having a diameter of 30 mm, similar to the holes 62a of the buffer sheet member 60a of Inventive example I.

The light-shielding member was the same as that of Conventional example I.

Films used were X-ray photographic films, and 150 X-ray photographic films were stored in each of the sheet film packages thus prepared.

The experimental results are given in the following table 1:

TABLE 1

| Prop- erties | Samples | | | | | | | Method |
|---|---|---|---|---|---|---|---|---|
| | A-I | A-II | A-III | B-I | B-II | B-III | C-I | |
| (1) | 16 | 16 | 17 | — | — | — | 16 | — |
| (2) | 19 | 20 | 21 | — | — | — | — | — |
| (3) | (a) | (a) | (a) | (d) | (e) | (e) | (a) | *A |
| (4) | (a) | (a) | (a) | (e) | (e) | (e) | (a) | *B |
| (5) | (b) | (b) | (b) | (c) | (c) | (b) | (b) | *C |
| (6) | (a) | (a) | (a) | (c) | (e) | (e) | (a) | *D |
| (7) | (a) | (a) | (b) | (e) | (a) | (a) | (a) | *E |
| (8) | (a) | (a) | (a) | (d) | (e) | (c) | (a) | *F |
| (9) | (a) | (a) | (a) | — | — | — | (e) | *G |
| (10) | 19 | 20 | 20 | — | — | — | 20 | — |

A-I: Inventive example I
A-II: Inventive example II
A-III: Inventive example III
B-I: Conventional example I
B-II: Conventional example II
B-III: Conventional example III
C-I: Comparative example The properties are defined as follows:
(1): Layer structure for the buffer sheet member (indicated by the number of a FIGURE)
(2): Shape of holes in the buffer sheet member (indicated by the the number of a FIGURE)
(3): Abrasion resistance measured by a vibration test
(4): Compression resistance
(5): Moisture-induced fog
(6): Abrasive fog
(7): Suction-air leakage detectability
(8): Dust prevention
(9): Efficiency of hole positioning in a dark room
(10): Shape of the protective board (indicated by the number of a FIGURE)

The levels of evaluation are defined as follows:
(a): Very excellent
(b): Excellent
(c): Practically usable
(d): Problematic
(e): Not practically usable The test methods are defined as follows:

*A: Abrasion resistance—150 X-ray photographic films were stored in one sheet film package, and five such sheet film packages (750 sheet films) were put in a corrugated cardboard box. After a vibration test was conducted on the sheet film packages according to JISZ-0232, the X-ray photographic films were checked for abrasion.

*B: Compression resistance—150 X-ray photographic films were stored in a sheet film package, and a sheet load of 5 kg was placed on the sheet film package for 2 weeks. Then, the recorded images were developed and checked for pressure-induced changes in density (pressure marks).

*C: Moisure-induced fog—Fogs due to moisture passing through the opening of the protective board were checked in the same manner as in B above.

*D: Abrasive fog—The recorded images on the X-ray photographic films on which the test A was carried out were developed and checked for changes in density.

*E: Suction-air leakage detectability- After all of the stored X-ray photographic films have been fed out of a sheet film package by the suction cup, it was checked whether the completion of film removal can be detected by air leakage without damaging the vacuum system.

*F: Dust prevention—150 X-ray photographic films were stored in one sheet film package, and five such sheet film packages were put in a corrugated cardboard box. After a vibration test had been conducted on the sheet film packages according to JISZ-02321, the films were loaded in a bright room. After the images on the films were developed, the images were checked for the number of spots produced due to dust deposits causing image development failures.

*G: Efficiency of hole positioning in a dark room—When X-ray photographic films and a buffer sheet member were put in the protective board, the efficiency of positioning the side of the buffer sheet member which has the air leaking holes for coaction with the suction cup 40 was checked.

Tests were also conducted using sheet-like photosensitive resin films, photographic sheets of paper, sheet-like lithographic films, and sheet-like infrared-sensitive films as films F. The results of these tests were similar to those of the tests using X-ray photographic films.

By using the buffer sheet members 60a through 60f, the same advantages as those of the buffer sheet member 60 can be attained. Particularly, the air leaking means can be positioned for coaction with the suction cup 40 irrespective of whether the buffer sheet members 60a through 60f are oriented in one direction or the other.

A sheet film package according to still another embodiment will be described with reference to FIGS. 25 and 26.

Figure 25:
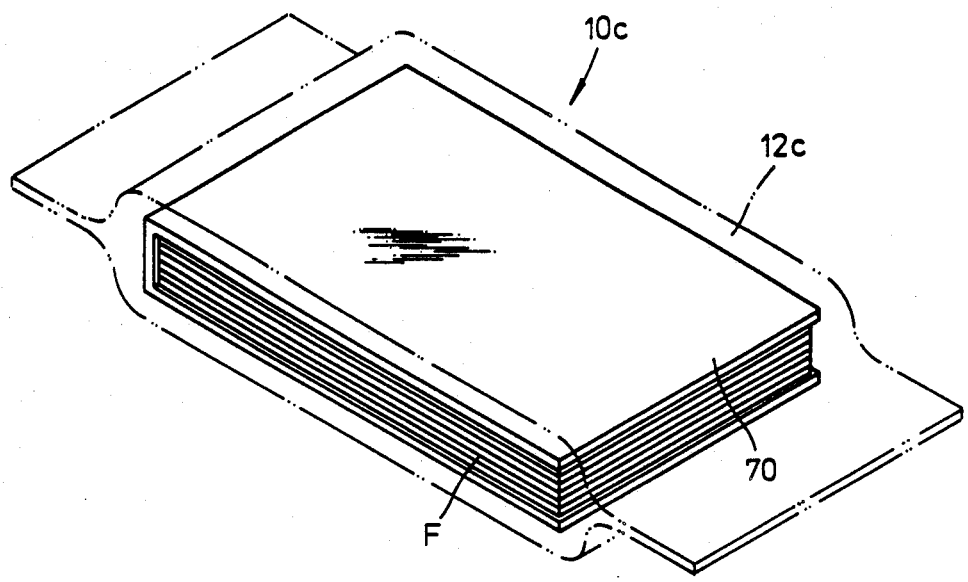
FIG. 25 is a perspective view of a sheet film package according to a still further embodiment of the present invention.
Figure 26:
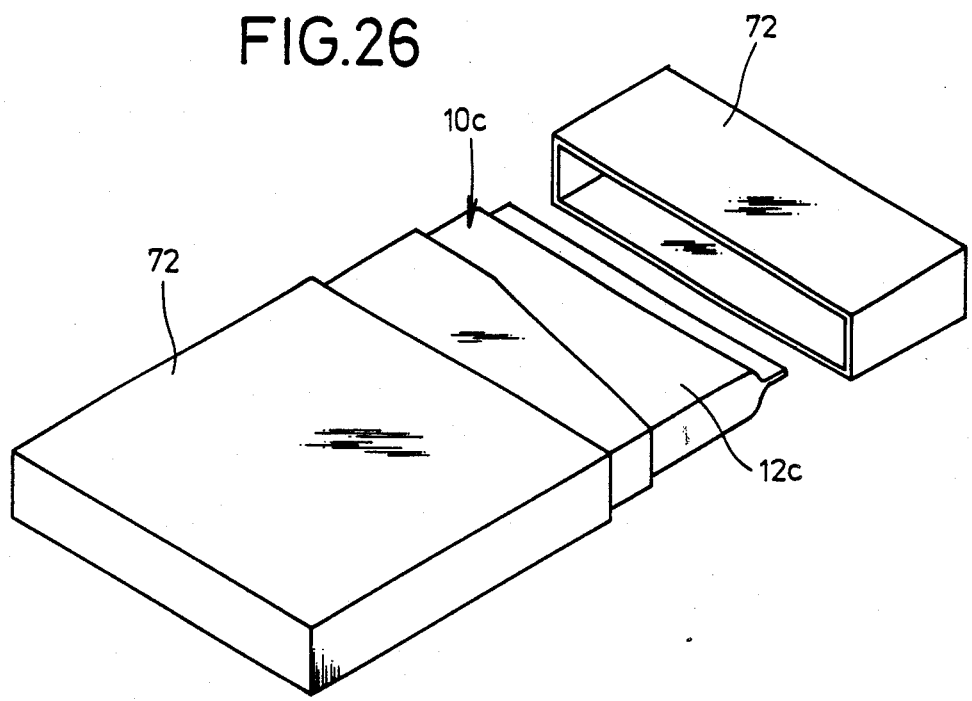
FIG. 26 is a perspective view of the sheet film package shown in FIG. 25 which is accommodated in a cardboard box.

As shown in FIG. 25, a sheet film package 10c comprises a flexible light-shielding member 12c and a protective board 70 disposed therein. The light-shielding member 12c is accommodated in a cardboard box 72 (FIG. 26) composed of interfittable box body and cover. The protective board 70 is of a U-shaped cross section and serves as film buffer means itself.

Various layer structures for the protective board 70 are illustrated in FIGS. 27 through 33.

Figure 27:
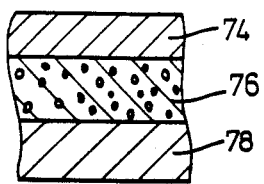
FIGS. 27 through 33 are fragmentary cross-sectional views of various layer structures for the protective board in a sheet film package of the present invention.

FIG. 27 shows a laminated protective board comprising a synthetic resin film layer 74, a foamed sheet layer 76, and a support layer 78, these layers being fused and bonded by being heated with hot air applied to their surfaces.

Figure 28:
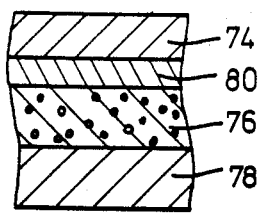

FIG. 28 illustrates a laminated protective board similar to the protective board shown in FIG. 27, but further including an adhesive layer 80 between the synthetic resin film layer 74 and the foamed sheet layer 76 to bond them.

Figure 29:
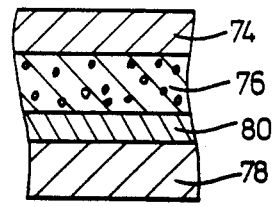

A laminated protective board shown in FIG. 29 is similar to the protective board shown in FIG. 27, but further includes an adhesive layer 80 between the foamed sheet layer 76 and the support layer 78 to bond them.

Figure 30:
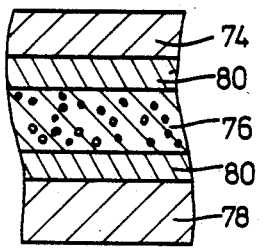

According to an embodiment of FIG. 30, the synthetic resin film layer 74, the foamed sheet layer 76, and the support layer 78 of the protective board shown in FIG. 27 are bonded by adhesive layers 80 therebetween.

Figure 31:
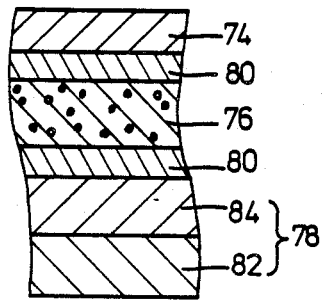

A laminated protective board illustrated in FIG. 31 is similar to that of FIG. 30 except that a laminated support layer 78 comprises a paper sheet layer 82 and an L-LDPE film layer 84 directly deposited thereon.

Figure 32:
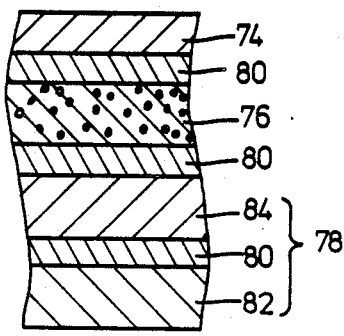

FIG. 32 shows a protective board which is similar to that of FIG. 31 except that a laminated support layer 78 also includes an adhesive layer 80 between the paper sheet layer 82 and the L-LDPE film layer 84 to bond them.

Figure 33:
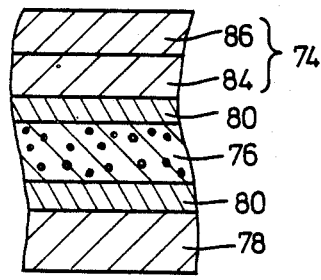

A protective board shown in FIG. 33 is similar to that of FIG. 30 except that a laminated synthetic resin film layer 74 comprises a two-layer coextruded film including an HDPE film layer 86 and an L-LDPE film layer 84.

The synthetic resin film layer 74 in each of the layer structures shown in FIGS. 27 through 33 is held in contact with the films F, and prevents the films F from having fogs due to moisure, pressure, and abrasion. Therefore, any of various synthetic resin films of suitable thickness may be used as the synthetic resin film layer 74 insofar as they have low permeability to water and smooth surfaces. Among various synthetic resin films, thermoplastic resin films of various kinds are preferable, and various polyolefin films are particularly preferable.

The surface of the synthetic resin film layer 74 should preferably have a slip angle of 25° or smaller. By the term "slip angle" is meant an angle of inclination of the surface of the synthetic resin film layer 74 at which a weight placed thereon starts to slide. Therefore, the slip angle is used to indicate the degree of being slippery of the surface being measured.

The foamed sheet layer 76 is made of the same material as that of the foamed layer 64 shown in FIGS. 11 through 18. Therefore, the foamed sheet layer 76 will not be described in detail.

The support layer 78 is made of any of various sheet materials such as a paper sheet, a synthetic resin sheet, or the like. Therefore, the support layer may be made of unbleached kraft paper or waste paper, or may be in the form of a sheet having large surface irregularities. While the support layer 78 may be a flexible sheet such as a sheet of thin machine-made paper or a thin synthetic resin film, the support layer 78 should preferably be more rigid than the synthetic resin film layer 74.

The support layer 78 may alternatively be in the form of a single-layer film, a paper sheet, a plastic sheet, a multilayer coextruded film layer of synthetic resin, or a multilayer sheet of synthtic resin and paper.

It is possible to add desired amounts of the various additives as described above, to the synthetic resin film layer 74. The adhesive layer 80 may be any of the various adhesives as described above.

The protective boards 14 of the various shapes according to the previous embodiments may be of the same structure as the protective board 70.

The results of an experiment conducted on Inventive examples Ia, IIa, IIIa, and Conventional example will be described below.

Inventive example Ia

This example employed the a protective board which substantially has the layer structure shown in FIG. 30. The synthetic resin film layer 74 comprised an inflated film having a thickness of 50 micrometers and made of L-LDPE which is a copolymer of ethylene and 4-methylpentene-1, having a density of 0.920 g/cm³ and a melt index of 2 g/ten minutes, to which there were added 3 weight % of carbon black and 0.1 weight % of olefin acid amide. The foamed sheet layer 76 was a foamed polyethylene sheet having a thickness of 1 mm and an expansion ratio of 30. The support layer 78 was a paper sheet having a thickness of 350 micrometers. The adhesive layer 80 was an LDPE adhesive layer, 15 micrometers thick.

Inventive Example IIa

This example employed the a protective board having the layer structure shown in FIG. 32. The synthetic resin film layer 74, the foamed sheet layer 76, and the adhesive layer 80 are identical to those of Inventive example Ia. The paper sheet layer 82 of the support layer 78 was in the form of a conventional paper board. The L-LDPE film layer 84 was the same as the synthetic resin film layer 74 of Inventive example Ia.

Inventive Example IIIa

This example employed the a protective board having the layer structure shown in FIG. 33. The HDPE film layer 86 of the synthetic resin film layer 74 comprised a film having a thickness of 25 micrometers and made of HDPE having a density of 0.965 g/cm³ and a melt index of 0.4 g/ten minutes, to which there were added 3 weight % of carbon black and 0.05 weight % of erucic acid amide. The L-LDPE film layer 84 was identical to the synthetic resin film layer 74 of Inventive example Ia, having a thickness of 25 micrometers. The synthetic resin film layer 74 was a two-layer coextruded film having a total thickness of 50 micrometer. The foamed sheet layer 76, the support layer 78, and the adhesive layer 80 were the same as those of Inventive example Ia.

Conventional Example

The protective board was in the form of a paper board made of bleached kraft paper and having a thickness of 450 micrometers.

200 X-ray photographic films were used as films F, which were wrapped in the light-shielding member 12c and stored in the cardboard box 72 for the experiment. The results of the experiment are given in the table 2.

The light-shielding member 12c was in the form of a multilayer sheet composed of bleached kraft paper of 35 g/m², an LDPE adhesive layer having a thickness of 15 micrometers, an aluminum foil layer having a thickness of 7 micrometers, an LDPE adhesive layer having a thickness of 15 micrometers, and an L-LDPE film layer having a thickness of 70 micrometers with 3 weight % of carbon black added.

Substantially the same results as given in the table 2 were obtained when lithographic films and cassette films were employed as films F. When a protective board comprising a foamed sheet layer with polyolefin film layers deposited on the opposite surfaces thereof was employed, substantially the same results as those of Inventive examples were also attained.

TABLE 2

| Properties | Samples | | | | Method |
|---|---|---|---|---|---|
| | A-Ia | A-IIa | A-IIIa | B | |
| (1) | FIG. 30 | FIG. 32 | FIG. 33 | | |
| (2) | (a) | (a) | (a) | (e) | *A1 |
| (3) | (a) | (a) | (a) | (e) | *B1 |
| (4) | (b) | (b) | (b) | (c) | *C1 |
| (5) | (a) | (a) | (a) | (d) | *D1 |
| (6) | 13 | 13 | 15 | 35 | *E1 |

The properties are defined as follows:
(1): Layer structure for the protective board
(2): Abrasion resistance in a vibration test
(3): Compression resistance (at a hole or a recess)
(4): Moisture-induced fog
(5): Abrasive fog
(6): Slip angle (in degrees)

The levels of evaluation are defined as follows:
(a): Very excellent
(b): Excellent
(c): Practically usable
(d): Problematic
(e): Not practically usable The test methods are defined as follows:
*A1: Abrasion resistance—200 X-ray photographic films were stored in one cardboard box 72 as shown in FIG. 26, and five such cardboard boxes (1000 sheet films) were put in a corrugated cardboard box. After a vibration test was conducted on the cardboard boxes according to JISZ-0232, the X-ray photographic films were checked for abrasion.

*B1: Compression resistance—200 X-ray photographic films were stored in a cardboard box 72 as shown in FIG. 26, and a sheet load of 5 kg was placed on the cardboard box 72 for 2 weeks. Then, the recorded images were developed and checked for pressure-induced changes in density (pressure marks).

*C1: Moisture-induced fog—Fogs due to moisture passing through the opening of the protective board were checked in the same manner as in B1 above.

*D1: Abrasive fog—The recorded images on the X-ray photographic films on which the test A1 was carried out were developed and checked for changes in density.

*E1: Slip angle—A surface is cut off from the protective board and applied to the bottom, having a size of 75 mm×35 mm, of a load block having a weight of 200 g. Another surface is cut off from the protective board and applied to an inclined surface. These protective board surfaces are mated, and the angle of inclination of the inclined surface is varied. The slip angle is the angle of the inclined surface at which the surfaces start to slip against each other.

In the sheet film package 10c, the synthetic resin film layer 74 of the protective board 70 which is in contact with the films F does not give off moisture or a harmful gas and does not allow moisture or a harmful gas to pass therethrough, so that the films F are prevented from having fogs or changes in sensitivity. Since the surface of the synthetic resin film layer 74 is smooth, it does not produce pressure marks, abrasive fogs, and abrasion on the films F even if they slide on the synthetic resin film layer 74. The foamed sheet layer 76 dampens external shocks applied thereto, so that the films F are not adversely affected by such external shocks.

With the present invention, as described above, a sheet film package comprises a flexible light-shielding member in the form of an envelope and a protective board for protecting sheet films stored in the light-shielding envelope. The protective board is of a substantially J- or U-shaped cross section and has a holder portion on one side edge thereof for preventing the films from being displaced. When the light-shielding member is pulled out after the package has been loaded in an image recorder, the films are prevented by the holder portion from being pulled out with the light-shielding member.

When the uppermost film is fanned in a direction substantially normal to the direction in which the light-shielding member has been pulled out, thereby ensuring that no two or more films will be fed out together, the fanned film tends to engage the upper panel of the protective board. However, since the upper panel is swingable, it does not obstruct the fanned movement of the film. Consequently, the sheet film package of the present invention permits the films to be easily and accurately loaded in the image recorder in which the films are fed out in the direction transverse to the film loading direction. The films as they are fanned are not damaged by the protective board, and can smoothly be fed out.

Moreover, a buffer sheet member is disposed between the protective board and the stored sheet films, and the buffer sheet member has suction air leaking means in two symmetrical areas thereof, one of which will be contacted by the suction cup. The suction air leaking means are effective in preventing the vacuum pump of the suction cup or suction mechanism while the buffer sheet member prevents the films from having pressure marks, gas-induced fogs, abrasive fogs, and abrasion. Since the suction air leaking means are positioned in the two symmetrical areas of the buffer sheet member, the buffer sheet member can easily be positioned for coaction with the suction cup even in a dark room.

The protective board itself of the sheet film package may be of a special layer structure for preventing moisture and harmful gas given off by a paper sheet thereof from directly contacting the films, which are therefore prevented from having fogs. The surface of the protective board which is held against the films is smooth to prevent the films from having pressure marks, abrasive fogs, and abrasion even when the sheet film package is vibrated during shipment, for example. The protective board also serves to prevent the films from suffering pressure marks which would otherwise caused by the holes thereof under external shocks and pressure.

Although certain preferred embodiments have been shown and described, it should be understood that many changes and modifications may be made therein without departing from the scope of the appended claims.

We claim:

1. A sheet film package comprising a flexible light-shielding member, a stack of sheet films stored in said light-shielding member, and a protective board disposed in said light-shielding member for protecting said sheet films, said protective board having upper and lower panels lying substantially parallel to each other in sandwiching relation to the sheet films, and pivot means associated with said upper panel for securing said upper panel such that said upper panel is swingable in a direction in which the sheet films will be fed out, said protective board including at least one holder portion integrally joined to one side edge of said upper panel and/or said lower panel for preventing the sheet films from being displaced in a direction transverse to said direction in which the sheet films will be fed out, and further including a buffer sheet member disposed on said lower panel of the protective board, said buffer sheet member having means for leaking suction air.

2. A sheet film package according to claim 1, wherein said means for leaking suction air comprises openings defined in said buffer sheet member.

3. A sheet film package according to claim 1, wherein said buffer sheet member substantially comprises a sheet of foamed thermoplastic resin.

4. A sheet film package comprising a flexible light-shielding member, a stack of sheet films stored in said light-shielding member, and a protective board disposed in said light-shielding member for protecting said sheet films, said protective board having upper and lower panels lying substantially parallel to each other in sandwiching relation to the sheet films, and pivot means associated with said upper panel for securing said upper panel such that said upper panel is swingable in direction in which the sheet films will be fed out, said protective board including at least one holder portion integrally joined to one side edge of said upper panel or said lower panel for preventing the sheet films from being displaced in a direction transverse to said direction in which the sheet films will be fed out, wherein said protective board is of a substantially bent configuration, said upper panel being shorter than said lower panel in said direction in which the sheet films will be fed out.

5. A sheet film package according to claim 4, further including a buffer sheet member disposed on said lower panel of the protective board, said buffer sheet member having means for leaking suction air.

6. A sheet film package according to claim 5, wherein said means for leaking suction air comprises openings defined in said buffer sheet member.

7. A sheet film package according to claim 5, wherein said buffer sheet member substantially comprises a sheet of foamed thermoplastic resin.

8. A sheet film package comprising a flexible light-shielding member, a stack of sheet films stored in said light-shielding member, and a protective board disposed in said light-shielding member for protecting said sheet films, said protective board having upper and lower panels lying substantially parallel to each other in sandwiching relation to the sheet films, and pivot means associated with said upper panel for securing said upper panel such that said upper panel is swingable in direction in which the sheet films will be fed out, said protective board including at least one holder portion integrally joined to one side edge of said upper panel or said lower panel for preventing the sheet films form being displaced in a direction transverse to said direction in which the sheet films will be fed out, wherein said upper and lower panels are separate from each other and arranged in interdigitated relation to each other, defining therebetween a space accommodating said sheet films, and further including a buffer sheet member disposed on said lower panel of the protective board, said buffer sheet member having means for leaking suction air.

9. A sheet film package according to claim 8, wherein said means for leaking suction air comprises openings defined in said buffer sheet member.

10. A sheet film package according to claim 8, wherein said buffer sheet member substantially comprises a sheet of foamed thermoplastic resin.

* * * * *